(12) United States Patent
Chandramouli et al.

(10) Patent No.: US 9,116,877 B2
(45) Date of Patent: Aug. 25, 2015

(54) PSYCHO-LINGUISTIC STATISTICAL DECEPTION DETECTION FROM TEXT CONTENT

(75) Inventors: Rajarathnam Chandramouli, Holmdel, NJ (US); Xiaoling Chen, Sugar Land, TX (US); Koduvayur P. Subbalakshmi, Holmdel, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 511 days.

(21) Appl. No.: 13/520,060

(22) PCT Filed: Jan. 6, 2011

(86) PCT No.: PCT/US2011/020390
§ 371 (c)(1),
(2), (4) Date: Oct. 22, 2012

(87) PCT Pub. No.: WO2011/085108
PCT Pub. Date: Jul. 14, 2011

(65) Prior Publication Data
US 2013/0046531 A1 Feb. 21, 2013

Related U.S. Application Data

(60) Provisional application No. 61/293,056, filed on Jan. 7, 2010.

(51) Int. Cl.
*G06F 17/27* (2006.01)
(52) U.S. Cl.
CPC ........ *G06F 17/2715* (2013.01); *G06F 17/2785* (2013.01)
(58) Field of Classification Search
CPC .................... G06F 17/2715; G06F 17/2785
See application file for complete search history.

(56) References Cited

U.S. PATENT DOCUMENTS 8,337,208 B1 * 12/2012 Thirumalainambi et al. 434/219
8,671,341 B1 * 3/2014 Hellwig et al. ............... 715/254
(Continued)

FOREIGN PATENT DOCUMENTS

WO    WO2011/085108    7/2011

OTHER PUBLICATIONS

Wald, Abraham. "Sequential tests of statistical hypotheses." The Annals of Mathematical Statistics 16.2 (1945): 117-186.*
(Continued)

*Primary Examiner* — Brian Albertalli
(74) *Attorney, Agent, or Firm* — Greenberg Traurig, LLP

(57) ABSTRACT

An apparatus and method for determining whether a text is deceptive may comprise analyzing a body of textual content known to be one of text containing true content and text containing deceptive content; identifying psycho-linguistic cues that are indicative of a text being deceptive; statistically analyzing, via a computing device, a given text based upon the psycho-linguistic cues to determine if the text is deceptive. The apparatus and method may further comprise weighting the psycho-linguistic cues and statistically analyzing based on the weighted psycho-linguistic cues. The statistically analyzing step may be performed using one of a cue matching analysis, a weighted cue matching analysis, a Markov chain analysis, and a sequential probability ratio testing binary hypothesis analysis. The psycho-linguistic cues may be separated into categories, including increasing trend cues and decreasing trend cues and analyzed according to presence in a category from within the categories.

14 Claims, 10 Drawing Sheets

(56) References Cited

U.S. PATENT DOCUMENTS

| | | | |
|---|---|---|---|
| 8,769,684 B2* | 7/2014 | Stolfo et al. | 726/23 |
| 2004/0153430 A1* | 8/2004 | Sayad | 706/61 |
| 2004/0193894 A1* | 9/2004 | Chaudhari et al. | 713/186 |
| 2005/0246165 A1* | 11/2005 | Pettinelli et al. | 704/207 |
| 2006/0095251 A1 | 5/2006 | Shaw | |
| 2007/0010993 A1 | 1/2007 | Bachenko et al. | |
| 2007/0039038 A1 | 2/2007 | Goodman et al. | |
| 2008/0016490 A1 | 1/2008 | Pabalate et al. | |
| 2008/0306365 A1 | 12/2008 | Bunce et al. | |
| 2009/0077617 A1 | 3/2009 | Levow et al. | |
| 2009/0094669 A1* | 4/2009 | Savadi et al. | 726/1 |
| 2010/0174813 A1* | 7/2010 | Hildreth et al. | 709/224 |

OTHER PUBLICATIONS

Fuller, Christie, et al. "An analysis of text-based deception detection tools." (2006).*

Mihalcea, Rada, and Carlo Strapparava. "The lie detector: Explorations in the automatic recognition of deceptive language." Proceedings of the ACL-IJCNLP 2009 Conference Short Papers. Association for Computational Linguistics, 2009.*

Burgoon, Judee K., and Tiantian Qin. "The dynamic nature of deceptive verbal communication." Journal of Language and Social Psychology 25.1 (2006): 76-96.*

Hirschberg, Julia Bell, et al. "Distinguishing deceptive from non-deceptive speech." (2005).*

Ma, Wanli, Dat Tran, and Dharmendra Sharma. "Detecting image based spam email." Advances in Hybrid Information Technology. Springer Berlin Heidelberg, 2007. 168-177.*

Grant et al., "CVX: Matlab Software for Disciplined Convex Programming", Nov. 2008; printed Apr. 17, 2013.

"Traceroute", Oct. 2008 [Online], available http://www.traceroute.org/and ping, as discussed in "ping" Oct. 2008 [Online], available http://en.wikipedia.org/wiki/Ping.

Linguistic Inquiry and Word Count, http:/liwc.net/, Jun. 2007, printed Apr. 17, 2013.

Teahan et al., "Tag Based Models of English Text", Waikato University, Hamilton, New Zealand, PhD Thesis, 1997.

Fong et al., "Detecting Word Substitutions in Text", IEEE Transactions on Knowledge and Data Engineering, vol. 20, No. 8, Aug. 2008, 10 pages.

Smith et al., "Forensic Psycholinguistics Using Language Analysis for Identifying and Assessing Offenders", http://www.diogenestic.com/statementlinguists.pdf, May 6, 2012.

Juola et al., "Learning to Translate: A Psycholinguistic Approach to the Induction of Grammars and Transfer Functions", http://citeseerx.ist.psu.edu, 1995.

International Search Report and Written Opinion for PCT/US2011/020390, mailed Mar. 16, 2011.

Abbasi et al., "Visualizing authorship for identification," In proceedings of the 4th IEEE symposium on Intelligence and Security Informatics, San Diego, CA, 2006.

Abbasi et al., "Writeprints: A stylometric approach to identity-level identification and similarity detection in cyberspace," ACM Transactions on Information Systems, No. 2, pp. 7:1-7:29, Mar. 2008.

Abi-Nimen, et al., "A comparison of machine learning techniques for phishing detection". In: processings of the eCrime researchers summit (2007).

Agrawal, et al, "Mining association rules between sets of items in large databases," ACM SOGMOD Record, No. 2, pp. 207-216,1993.

Apache software foundation, Spamassassin public corpus, http://spamassassin.apache.org/publiccorpus/, Jun. 2006.

Argamon, et al., "Style mining of electronic messages for multiple authorship discrimination: first results," in Proceedings of 2003 SIGKDD, Washington, DC, U.S.A, 2003.

Bell, "DMC data compression scheme" http://comjnl.oxfordjournals.org/content/32/1/16.abstract.

Benevenuto, et al., "Detecting Spammers on Twitter" CEAS 2010—Seventh annual Collaboration, Electronic messaging, Anti-Abuse and Spam Conf., Jul. 13-14, 2010, Redmond, Washington, US.

Bergholz, et al., "Improved phishing detection using model-based features," in In Proceedings of the Conference on Email and Anti-Spam (CEAS), 2008.

Biswas, et al., "Semidefinite programming based algorithms for sensor network localization," in ACM Transactions on Sensor Networks, vol. 2, No. 2,2006, pp. 188-220.

Bratko, et al. Spam filtering using statistical data compression models. J. Mach. Learn. Res.,7:2673-2698, 2006.

Buller et al., "Interpersonal deception theory," Communication Theory, vol. 6, No. 3, pp. 203-242,1996, Chapter 7, pp. 97-109.

Burgoon et al., "Interpersonal deception: Iii. effects of deceit on perceived communication and nonverbal behavior dynamics." Journal of Nonverbal Behavior, vol. 18, No. 2, pp. 155-184, 1994.

Burgoon, J. P. Blair, T. Qin, and J. F. Nunamaker, "Detecting deception through linguistic analysis," /S/, pp. 91-101,2003.

Carlson, et al., "Deception in computer-mediated communication", Academy of Management Journal, under Review, (2001).

Chakrabarti, et al., "Focused Crawling: A New Approach to Topic-Specific Resource Discovery," in Computer Networks, 1997, pp. 1-22.

Chandrasekaran, et al., "Phishing email detection based on structural properties", in: NYS Cyber Security Conference (2006).

China Natural Language Open Platform(CNLOP), China Natural Language Open Platform http://www.nlp.org.cn/.

Cleary et al., Unbounded length contexts for PPM, The Computer J., vol. 40, pp. 67-75,1997.

Cleary, et al., "Data compression using adaptive coding and partial string matching", IEEE Transactions on Communications, vol. 32 (4), pp. 396-402, (1984).

Cormack et al., Data Compression Using Dynamic Markov Modeling, The Computer Journal, vol. 30, No. 6, 1987 ,pp. 541-550.

Corney, et al., "Gender-preferential text mining of e-mail discourse," in 18th Annual Computer Security Applications Conference, 2002, pp. 21-27.

Corney, et al., "Identifying the authors of suspect email," http://eprints.qut.edu.au/archive/00008021/, Oct. 2008.

Cunningham, "GATE, a General Architecture for Text Engineering," Computers and the Humanities, vol. 36, No. 2, pp. 223-254, 2002.

Dabek, et al., "Vivaldi: A decentralized network coordinate system," in ACM SIGCOMM 2004, Aug. 2004.

de Vel, "Mining e-mail authorship," in Proceedings of KDD-2000 Workshop on Text mining, Boston, U.S.A, Aug. 2000.

deVel, et al., "Mining email content for author identification forensics," ACM SIGMOD Record, vol. 30, pp. 55-64, 2001.

Diliegenti, et al., "Focused crawling using context graphs," in In 26th International Conference on Very Large Databases, VLDB 2000, 2000, pp. 527-534.

Drucker et al., Support vector machines for spam categorization, IEEE Transactions on Neural Networks, 10 (1999), pp. 1048-1054.

Ekman et al., "Who can catch a liar?" American Psychologist, vol. 46, pp. 913-920,1991.

Farach, "Optimal suffix tree construction with large alphabets. In Proceedings of the 38th Annual Symposium on Foundations of Computer Science" (FOCS '97). (1997) IEEE Computer Society, Washington, DC, USA, 137.

Fette, et al., A., "Learning to Detect Phishing Emails", In: Proceedings of International World Wide Web conference, Banff, Canada. (2007) pp. 1-8.

Fraley et al., How Many Clusters? Which Clustering Method? Answers Via Model-Based Cluster Analysis, The Computer Journal, 41, pp. 578-588, 1998.

Frank, et al., "Text categorization using compression models," in In Proceedings IEEE Data Compression Conference, Snowbird,Utah, 2000.

Gayo-Avello et al., "Ovencoming Spammers in Twitter—A Tale of Five Algorithms", CER1 2010, Madrid, Espana, pp. 41-52.

Goodman, et al.,"The use of stylometry for email author identification: a feasibility study." http://utopia. csis.pace.edu/cs691/2007-2008/team2/docs/7:1 EAM2-TechnicalPaper.061213-Final.pdf, Oct. 2008.

(56) References Cited

OTHER PUBLICATIONS

Google Translate Toolkit (GTT), "The Internet, Google Translate and Google Translator Toolkit—Nuisance or Necessity in Translator Training?", http://lodel.irevues.inist.fr/tralogy/index.php?id=113, 1 page, printed Sep. 27, 2012.
GTrace—A Graphical Traceroute, Nov. 2008. [Online]. Available: http://www.caida.org/tools/visualization/gtrace/ ; 2 pages, printed Oct. 3, 2012.
Gueye, et al., "Constraint-based geolocation of internet hosts," in IEEE/ACM Transactions on Networking, vol. 14, No. 6, Dec. 2006.
Gusfield, "Algorithms on Strings, Tree and Sequences", Cambridge university press.
Hancock, "Automated lingusitic analysis of deceptive and truthful synchronous computer-mediated communication," in Proceedings of the 38th Hawaii International Conference on System Sciences, Hawaii, U.S.A., 2005.
Hancock, et al., "Lies in conversation: An examination of deception using automated linguistic analysis," in Proceedings of the 26th Annual Conference of the Cognitive Science Society, 2005, pp. 534-539.
Iqbal, et al., "A novel approach of mining write-prints for authorship attribution in e-mail forensics," Digital investigation, vol. 5, pp. S42-S51, 2008.
Khmeler et al., "A repetition based measure for verification of text collections and for text categorization," in Proc. of the 26th annual international ACM SIGIR conference on Research and development in information retrieval, 2003, pp. 104-110.
Kraut, "Verbal and nonverbal cues in the perception of lying," Journal of Personality and Social Psychology, pp. 380-391,1978.
Lee, et al., "Uncovering social Spammers: Social Honeypots+Machine Learning", SIGIR'10, Jul. 19-23, 2010, Geneva, Switzerland.
Linguistic inquiry and word count, http://www.liwc.net/, Jun. 2007, printed Sep. 25, 2012.
Lucas, W., "Effects of e-mail on the organization", European Management Journal, 16(1), 18-3, (1998).
Madhusudan, "On a text-processing approach to facilitating autonomous deception detection," in Proceedings of the 36th Hawaii International Conference on System Sciences, Hawaii, U.S.A., 2003, pp. 1-10.
Marton, et al., "On Compression-Based Text Classification," Proceedings of the 27th European Conference on IR Research (ECIR), Santiago de Compostela, Spain, 2005, pp. 300-314.
Mealand, "Correspondence Analysis of Luke", http://llc.oxfordjournals.org/content/10/3/171.abstract, 1 page, printed Oct. 17, 2012.
Menczer et al., "Adaptive information agents in distributed textual environments," in Proceedings of the Second International Conference on Autonomous Agents, Minneapolis USA, 1998.
Menczer, "Arachnid: Adaptive retrieval agents choosing heuristic neighborhoods for information discovery," in Machine Learning: Proceedings of the 14th International Conference (ICML97), Nashville, USA, 1997.
Moffat, "Implementing the PPM data compression scheme", IEEE Transactions on Communications, 38(11): 1917-192 (1990).
Natural Language Toolkit, 2009, 2 pages, http://www.nitk.org/.
Newman et al., "Emotion, disclosure, and health. American Psychological Association", 1995, and M. L. Newman, J. W. Pennebaker, D. S. Berry, and J. M. Richards, "Lying words: Predicting deception from linguistic styles," Personality and Social Psychology Bulletin, vol. 29, pp. 665-675, 2003.
Ng et al., "Predicting internet network distance with coordinates-based approaches," in IEEE INFOCOM, Jun. 2002.
Nigam, et al., "Semi-Supervised Text Classification Using EM", in Chapelle, 0., Zien, A., and Scholkopf, B. (Eds.) Semi-Supervised Learning. MIT Press: Boston. 2006.
Padmanabhan et al., "An investigation of geographic mapping techniques for internet hosts," in ACM SIGCOMM 2001, Aug. 2001.
Pampapathi et al.. "A suffix tree approach to anti-spam email filtering", Machine Learning, vol. 65 Issue 1, (2006) pp. 1-39.

Peng, et al., "Automated authorship attribution with character level language models," in Processings of the 10th Conference of European Chapter of the Association for Computational Linguistics, 2003.
Phishing corpus, http://monkey.org/7Ejose/wiki/doku.php?id=PhishingCorpus, Aug 2007.
Pig Busters, http://www.pigbusters.net/ScamEmails.htm.
Pinkerton, "Web crawling: Finding what people want," in Proceedings of the First World Wide Web Conference, Geneva,Switzerland, 2000, 105 pages.
Planetlab, 2008. [Online]. Available: http://www.planet-lab.org.
Qin, et al., "An exploratory study on promising cues in deception detection and application of decision tree," in Proceedings of the 37th Hawaii International Conference on System Sciences, Hawaii, U.S.A., 2004.
Qin, et al., "Modality effects in Deception Detection and Applications in Automatic-deception-detection", Proceedings of the 38th Hawaii International Conference on System Sciences. Hawaii, U.S.A (2005), pp. 1-10.
The Radicati Group, Radicati Group http://www.radicati.com/.
Richards, "Emotion regulation and memory: The cognitive costs of keeping one's cool,"Journal of Personality and Social Psychology, vol. 79, pp. 410-424, 2000.
Richards et al., "Composure at any cost? The cognitive consequences of emotion suppression," Personality and Social Psychology Bulletin, vol. 25, pp. 1033-1044,1999.
Roussinov, et al., "Detecting word substitutions: Pmi vs. hmm." in SIGIR. ACM, 2007, pp. 885-886.
Sahami et al., A bayesian approach to filtering junk e-mail, in Proceedings of the AAAI-98 Workshop on Learning for Text Categorization, 1998.
Shah, "Implementing of an effective web crawler," http://www.devbistro.com/articles/Misc/Implementing-Effective-Web-Crawler, printed Sep. 26, 2012.
Scam-O-Rama. [Online]. Available: http://scamorama.com ; pp. 1-46, printed Oct. 4, 2012.
Sharman, "Maximum likelihood parameter estimation by simulated annealing," in Acoustics, Speech, and Signal Processing, ICASSP-88, Apr. 1988.
Shkapenyuk et al., 2002S, "Design and implementation of a high performance distributed crawler," in Proceedings of 18th International Conference on Daa Engineering(ICDE), San Jose,USA, 2002.
Skillicorn, "Beyond keyword filtering for message and conversation detection," in IEEE International Conference on Intelligence and Security Informatics, 2005.
Smets et al., Automatic Vandalism Detection in Wikipedia: Towards a Machine Learning Approach, Association for the Advancement of Artificial Intelligence (2008) pp. 43-48 (no other info).
Snopes.com, "Thousand dollar bill" [Online], 18 pages Available:http://www.snopes.com/inboxer/nothingibillgate.asp ; printed Oct. 24, 2012.
Spam Assassin "The Apache SpamAssassin Project Public Corpus", http://spamassassin.apache.org/publiccorpus/ 2 pages, printed Sep. 27, 2012.
Spence, "The deceptive brain," Journal of the Royal Society of Medicine, vol. 97, No. 1, pp. 6-9, Jan. 2004. [Online] .http://www.ncbi.nlm.nih.gov/pmc/ articles/PMC1079256/pdf/0970006.pdf ("Spence").
Spracklin, et al., "Using the complexity of the distribution of lexical elements as a feature in authorship attribution," in Proceeding of LREC, 2008, pp. 3506-3513.
Tang et al., "Virtual landmarks for the internet," in ACM Internet Measurement Conf. 2003, Oct. 2003.
Teahan et al., "Using compression-based language models for text categorization," in Proceedings of 2001 Workshop on Language Modeling and Information Retrieval, 2001.
The cooperative association for internet data analysis, Nov. 2008.
The Free Dictionary by FARLEX http://www.thefreedictionary.com, printed Aug. 3, 2012.
The Yahoo! Geo Technologies Blog. WOEIDS Are Trending on Twitter [Online]. Available: http://web.archive.org/web/20091205160022/http://www.ygeoblog.com/2009/11/woeids-are-trending-on-twitter/ ; printed Oct. 4, 2012.

(56) References Cited

OTHER PUBLICATIONS

Twitter Scam Incidents Growing: The 5 Most Common Types of Twitter Scams—and 10 Ways to Avoid Them, http://www.scambusters.org/twitterscam.html,2010, 4 pages, printed Sep. 27, 2012.

Twitter Spam: 3 Ways Scammers are Filling Twitter With Junk, http://web.archive.org/web/20090618173995/http://mashable.com/2009/06/15/twitter-scams/, 2009, printed Oct. 4, 2012.

Ukkonen, "On-line construction of suffix tree", Algorithmica, Vol. 14, pp. 249-260, (1995).

Vrij, et al., "Detecting deceit via analysis of verbal and nonverbal behavior," Journal of Nonverbal Behavior, pp. 239-264, 2000.

Wang,"Don't Follow Me: Spam Detection in Twitter, Int'l Conf. on Security and Cryptography (SECRYPT)", 2010.

Weiner, "Linear pattern matching algorithm", 14th Annual IEEE Symposium on Switching and Automata Theory. pp. 1-11 (1973).

WinRAR archiver, a powerful tool to process RAR and ZIP files, http://www.markosweb.com/http://www.rarlab.com/, 7 pages, printed Sep. 25, 2012.

Witten et al., The zero-frequency problem: Estimating the probabilities of novel events in adaptive text compression, IEEE Trans. Inf. Theory, vol. 37, No. 4, pp. 1085-1094, Jul. 1991.

Wong, et al., "Octant: A comprehensive framework for the geolocalization of internet hosts," in Proceedings of Symposium on Networked System Design and Implementation, Cambridge, Massachusetts, Apr. 2007.

Xu, et al., "Training Sparn Assassin with Active Semi-supervised Learning", CEAS 2009—Sixth Conf. on Email and Anti-Spare Jul. 16-17, 2009, Mountain View, California USA.

Yardi, et al., "Detecting spam in a Twitter network", First Monday, 15(1), Jan. 2010, pp. 1-16, printed Sep. 27, 2012.

Yeung, A first course in information theory. Springer, 2002.

Yin, et al., "A New Intrusion Detection Method Based on Behavioral Model," Proceedings of the 5th World Congress on Intelligent Control and Automation; Hangzhou, P.R. China, Jun. 2004, pp. 4370-4374.

Zheng, et al., "A framework for authorship identification of online messages: Writing-style features and classification techniques," Journal of the American society for Information and Technology, vol. 57, No. 3, pp. 378-393, 2006.

Zheng, et al., "Internet Routing Policies and Roundtrip-Times," Passive and Active Measurement Workshop (PAM 2005), Mar. 2005, pp. 1-14.

Zhou et al., "Can online behavior unveil deceivers?—an exploratory investigation of deception in instant messaging," in Proceedings of the 37th Hawaii International Conference on System Sciences, Hawaii, U.S.A., 2004.

Zhou et al., "Modeling and handling uncertainty in deception detection," in Proceedings of the 38th Hawaii International Conference on System Sciences, Hawaii, U.S.A., 2005.

Zhou, "An empirical investigation of deception behavior in instant messaging," IEEE Transactions on Professional Communication, vol. 48, No. 2, pp. 147-160, Jun. 2005.

Zhou, "Automating linguistics-based cues for detecting deception in text-based asynchronous computer-mediated communication," Group Decision and Negotiation, vol. 13, pp. 81-106, 2004.

Zhou, et al., "A comparison of classification methods for predicting deception in computer-mediated communication," Journal of Management Information Systems, vol. 20, No. 4, pp. 139-165, 2004.

Zhou, et al., "A Longitudinal Analysis of Language Behavior of Deception in E-mail," Proceedings of Intelligence and Security Informatics, vol. 2665, (2003), pp. 102-110.

Zhou, et al., "An exploratory study into deception detection in text-based computer-mediated communication," in Proceedings of the 36th Hawaii International Conference on System Sciences, Hawaii, U.S.A., 2003.

Zhou, et al., "Language dominance in interpersonal deception in computer-mediated communication," Computers in Human Behavior, vol. 20, pp. 381-402, 2004.

Zhou, et al.,"A statistical language modeling approach to online deception detection", IEEE Transactions on Knowledge and Data Engineering 20, 8, 1077-1081 (2008).

Zhu, Semi-Supervised Learning Literature Survey, Computer Sciences Technical Report 1530, Univ. of Wisconsin, Madison, 2006.

Ziviani, et al., "Improving the accuracy of measurement-based geographic location of Internet hosts," Computer Networks, vol. 47, No. 4, Mar. 2005, pp. 1-21.

Ziviani, et al., "Toward a measurement-based geographic location service," in Passive and Active Measurement Workshop (PAM 2004), Apr. 2004.

\* cited by examiner

PSYCHO-LINGUISTIC STATISTICAL DECEPTION DETECTION FROM TEXT CONTENT

CROSS-REFERENCE TO RELATED APPLICATIONS

The present application claims priority to Provisional Application No. 61/293,056, filed on Jan. 7, 2010, entitled PSYCHO-LINGUISTIC STATISTICAL DECEPTION DETECTION FROM TEXT CONTENT, the disclosure of which is incorporated herein by reference in its entirety for all purposes.

STATEMENT REGARDING FEDERALLY SPONSORED RESEARCH

Some of the research performed in the development of the disclosed subject matter was supported in part by funds from the U.S. Government ONR Grant No. FA8240-07-C-0141. The U.S. government may have certain rights in the claimed subject matter.

FIELD

The present invention relates to psycho-linguistic modeling and statistical analysis for detecting deception, and, more particularly, to psycho-linguistic modeling and statistical analysis for detecting deception in text content, such as, an electronic text communication message, such as, an email text.

BACKGROUND

Deception is the intentional falsification of truth. There are many shades of deception from outright lies to "spin". Content in social networking sites such as Craigslist and Facebook, blogs, emails, witness testimonies in a court of law, answers to job interview questions, personal essays in online dating services, insurance claim forms, etc. are candidates for deception.

The Internet is evolving into a medium that is beyond just web searching. Text based applications such as emails, social networks, chat rooms, blogs, etc. are some applications that are already popular or gaining popularity. E-mail is one of the most commonly used communication media today. Clearly, this presents opportunities for deceptive or fraudulent activities. Deception is interpreted to be the manipulation of a message to cause a false impression or conclusion, as discussed in Burgoon, et al., "Interpersonal deception: Ill effects of deceit on perceived communication and nonverbal behavior dynamics." Journal of Nonverbal Behavior, vol. 18, no. 2, pp. 155-184 (1994) ("Burgoon), which is incorporated by reference herein. Psychology studies show that a human beings ability to detect deception is poor. Therefore, automatic techniques to detect deception are important.

There has been a reasonable amount of research on deception in face-to-face communication, as discussed for example in Burgoon, Buller, et al., "Interpersonal deception theory," Communication Theory, vol. 6, no. 3, pp. 203-242 (1996) ("Buller") and Burgoon, et al., "Detecting deception through linguistic analysis," ISI, pp. 91-101 (2003) ("Burgoon II"), the disclosures of which are hereby incorporated by reference. There is very little work in modeling and detecting deception in text, especially relatively short texts, such as, electronic textual communication messages, such as emails. In face-to-face communication or in vocal communication (e.g., cell phone communication) both verbal and non verbal features (also called cues) can be used to detect deception. But, the problem is harder in, e.g., email communication because only the textual information is available to the deception detector. Previous research regarding deception detection use theories developed for deception detection in face-to-face communication, such as is discussed in Zhou, et al., "An exploratory study into deception detection in text-based computer-mediated communication," Proceedings of the 36th Hawaii International Conference on System Sciences, Hawaii, U.S.A. (2003) ("Zhou"), Zhou, "Automating linguistics-based cues for detecting deception in text-based asynchronous computer-mediated communication," Group Decision and Negotiation, vol. 13, pp. 81-106, (2004) ("Zhou II"); Zhou, et al., "Language dominance in interpersonal deception in computer-mediated communication," Computers in Human Behavior, vol. 20, pp. 381-402 (2004) (Zhou III") and Zhou, "An empirical investigation of deception behavior in instant messaging," IEEE Transactions on Professional Communication, vol. 48, no. 2, pp. 147-160 (June 2005) ("Zhou IV"), the disclosures of which are incorporated by reference herein.

Some deception detection theories include media richness theory, channel expansion theory, interpersonal deception theory, statement validity analysis and reality monitoring. Some studies show that the cue space may be richer for instant messaging type applications, such as is discussed in Zhou, et al., "Can online behavior unveil deceivers?—an exploratory investigation of deception in instant messaging," Proceedings of the 37th Hawaii International Conference on System Sciences, Hawaii, U.S.A., 2004 ("Zhou V") and Madhusudan, "On a text-processing approach to facilitating autonomous deception detection," in Proceedings of the 36th Hawaii International Conference on System Sciences, Hawaii, U.S.A. (2002) ("Madhusudan"), the disclosures of each of which are incorporated by reference herein.

It has been recognized that cues that indicate deception ("deception indicators") for instant messaging type data and email data may differ. In Zhou, et al., "A comparison of classification methods for predicting deception in computer-mediated communication," Journal of Management Information Systems, vol. 20, no. 4, pp. 139-165 (2004) ("Zhou VI"), which is incorporated by reference herein, the authors apply discriminatory analysis, logistic regression, decision trees and neural networks for deception detection. A neural networks based classifier is observed to achieve the most consistent and robust performance. In Thou, et al. "Modeling and handling uncertainty in deception detection," Proceedings of the 38th Hawaii International Conference on System Sciences, Hawaii, U.S.A. (2005) ("Zhou VII"), which is incorporated by reference herein, the model of uncertainty in deception detection is considered. A neuro-fuzzy method is proposed to detect deception and is shown to outperform the previous cues-based classifiers. See also Zhou, et al., "A statistical language modeling approach to online deception detection," IEEE Transactions on Knowledge and Data Engineering (2008) ("Zhou VIII"), which is incorporated by reference herein. It is noted that analyzing emails for deception is a harder problem because of their typically smaller average word length. What is needed is a method of detecting deception in emails.

SUMMARY

The disclosed subject matter overcomes the disadvantages and shortcomings of the prior art discussed above by providing a method for the detection of deception in electronic text communication texts, such as, email texts, based on novel psycho-linguistic modeling and statistical analysis methods. More particularly, the present invention utilizes novel psycho-linguistic modeling which has identified 16 psycho-linguistic cues that are strong indicators of deception in email, and which employs four deception detectors. Experiments using real-life data show that the four deception detectors can achieve high rates of accuracy with low false alarm probabilities.

A data compression based model building and classification method to classify a target text document as deceptive or not is also described. The model building process is based on prediction by partial matching, such as is discussed in Cleary, et al, "Data compression using adaptive coding and partial string matching," IEEE Transactions on Communications, Vol. 32, pp. 396-402 (April 1984), the disclosure of which is incorporated by reference. The classification problem is the result of a cross entropy optimization problem.

BRIEF DESCRIPTION OF THE DRAWINGS

For a more complete understanding of the present invention, reference is made to the following detailed description of a exemplary embodiments considered in conjunction with the accompanying drawings, in which line elements have been identified with like reference numerals, and regarding which.

DETAILED DESCRIPTION OF EXEMPLARY EMBODIMENTS

Figure 1:
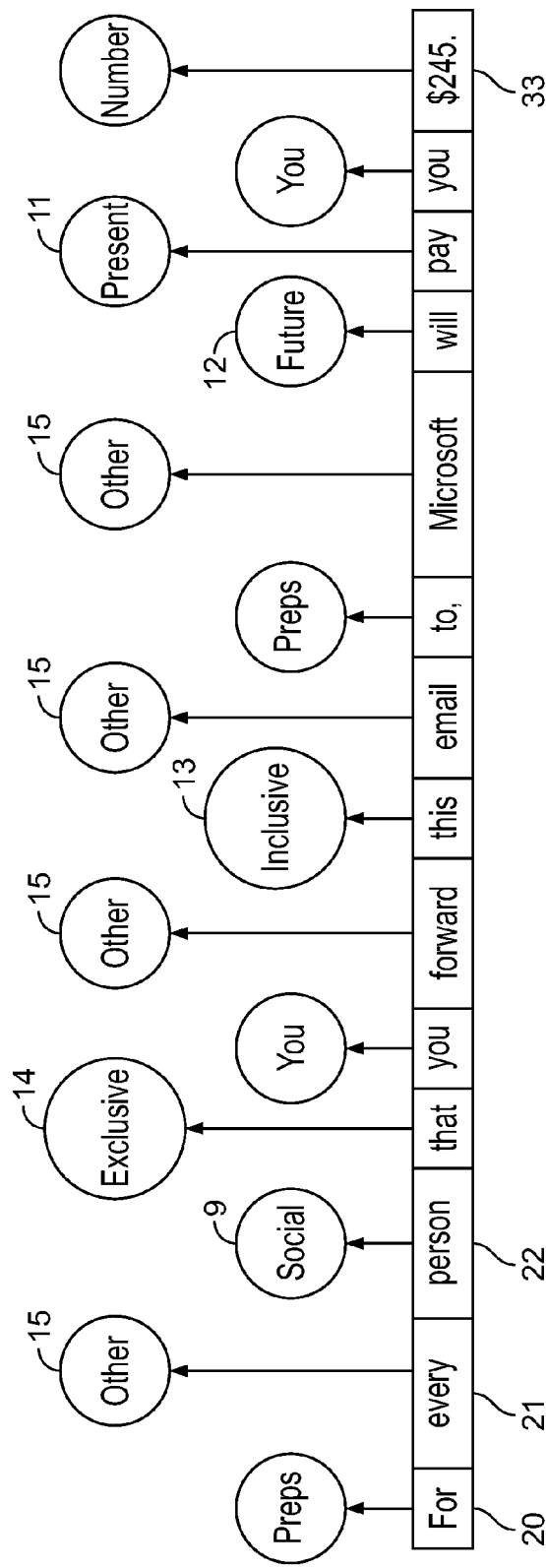
FIG. 1 is an example of a Markov chain of cues.

The presently disclosed subject matter provides an apparatus and method for the detection of deception in electronic text, such as emails. Since deception is a cognitive process, a psycho-linguistic cues-based approach has been adopted by applicants. In general, a psycho-linguistic cues-based deception detection includes several steps: identifying psycho-linguistic cues that indicate deceptive text; computing and representing these cues from the given email text; ranking the cues from the most to least significant; statistical modeling of the cues; designing an appropriate hypothesis test for the problem; and testing with real-life data to assess the performance.

According to aspects of an embodiment of the disclosed subject matter, psycho-linguistic analysis identifies 16 important cues that are strong indicators of deception in email text, and novel statistical models are provided for these cues based on real-life deceptive and truthful email data sets. Four statistical deception detectors are provided, and are compared with a decision tree classifier for the determination of deception detection accuracy. Scam, phishing and ham email data sets have been used for the experiments.

Experiment Data Set and Cues

Experimental data sets have been used for modeling and analysis of deception indicators. Establishing ground truth data is a major challenge to address in relation to the deception detection problem, as is illustrated as part of the block diagram of process steps for a process 100 shown in FIG. 6. Under the definition of deception applied in the present application, i.e., the manipulation of a message to cause a false impression or conclusion, email scams and phishing fall under the deceptive email category. Phishing emails attempt to deceptively acquire sensitive information from a user by masquerading the source as a trustworthy entity, as discussed in Fette, et al., "Learning to detect phishing emails," Proceedings of International World Wide Web Conference, Banff, Canada (2007) ("Fette"), which is incorporated by reference herein. The phishing email corpus, as discussed in "Phishing corpus," http://monkey.org/7Ejose/wiki/doku.php?id=PhishingCorpus (August 2007) ("Phishing"), which is incorporated by reference herein, can be used to extract deception indicator cues and their statistical modeling. For every email, only the body of email has been used. Duplicate emails were deleted resulting in 315 phishing emails in the final data set. For this purpose, 319 truthful emails (i.e., not deceptive) were used from the normal email corpus (20030228-easy-ham-2), as discussed in "Apache software foundation," Spamassassin public corpus, http://spamassassin.apache.org/publiccorpus/ (June 2006) ("Apache"), which is incorporated by reference herein.

The Linguistic Inquiry and Word Count (LIWC), as discussed in "Linguistic inquiry and word count," http://www.liwc.net/ (June 2007) ("LIWC"), which is incorporated by reference herein, (i.e., a psycho-linguistic feature computing engine) has been used to automatically extract deception indicator cues. Using the LIWC, up to 88 output variables can be computed for each email, including 19 standard linguistic dimensions (e.g., word count, percentage of pronouns, articles), 25 word categories tapping psychological constructs (e.g., affect, cognition), 10 dimensions related to "relativity" (time, space, motion), 19 personal concern categories (e.g., work, home, leisure activities), 3 miscellaneous dimensions (e.g., swear words, non-fluencies, fillers) and 12 dimensions concerning punctuation information, as discussed in "Linguistic inquiry and word count," http://www.liwc.net/ (June 2007) ("LIWC II"), which is incorporated by reference herein. The 88 variables include the information about linguistic style, structural composition elements and the frequency of different categories, the extraction of which can occur in block 102 of FIG. 6.

Figure 6:
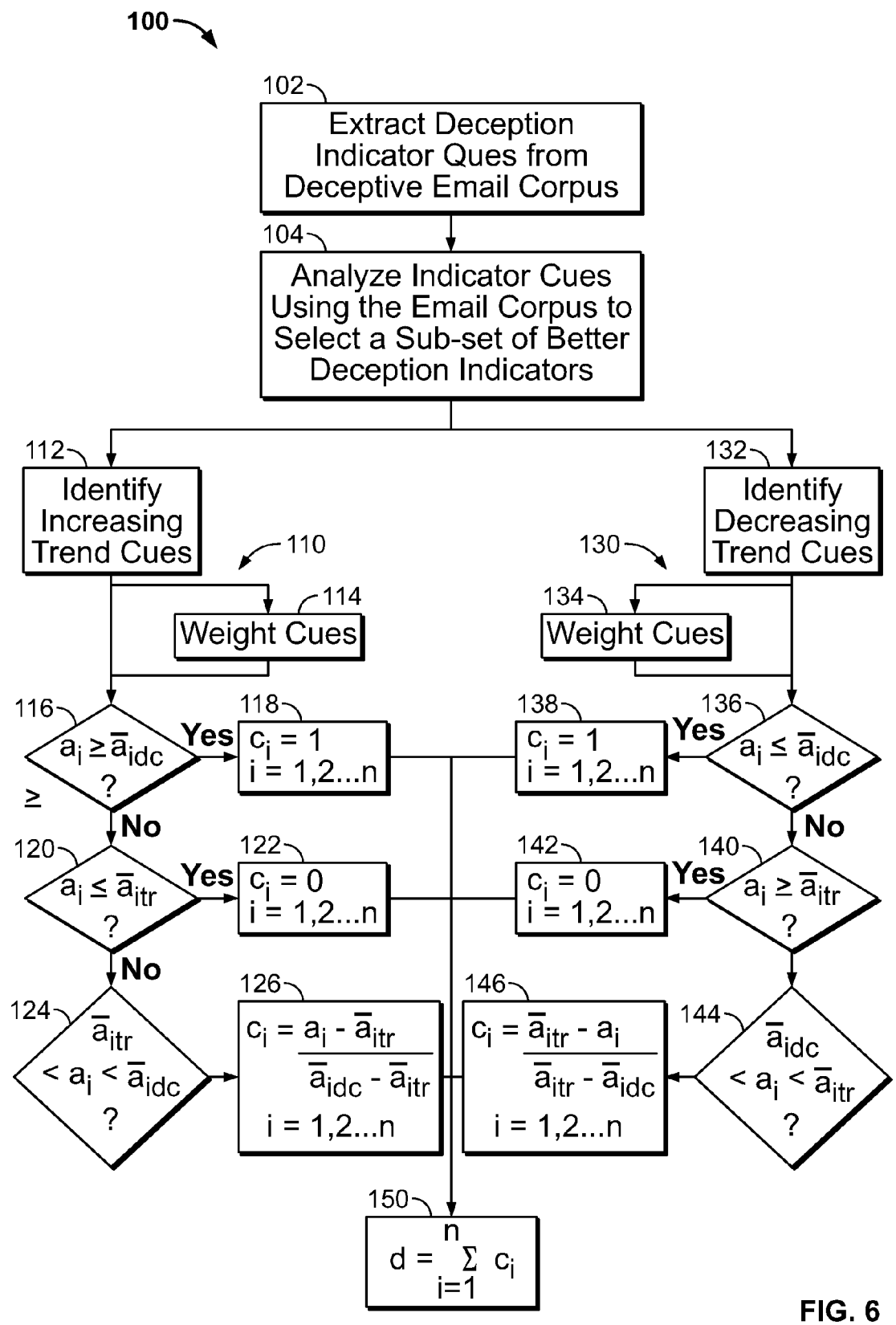
FIG. 6 illustrates schematically and in block diagram form process steps according to aspects of an embodiment of the disclosed subject matter.

Applicants have determined, using statistical experiments using the data sets, that the 16 cues listed in Table 1 are better indicators of deception among the 88 cues, as indicated by the process step of block 104 in FIG. 6. Therefore, from this analysis, it has been concluded that deceptive emails will have the following 16 cues, i.e., more (1) words, (2) first person plural words, (3) inclusive words, (4) affective language, (5) optimism and energy words, (6) social process words and less (7) diversity, (8) first person singular pronouns, (9) third person pronouns, (10) assent language, (11) insight words, (12) tentative words and (13) exclusive words, along with also less (14) past verbs, (15) present verbs and (16) future verbs. Table 1 lists these strong deception indicator cues and some examples for the more subjective cue types.

TABLE 1

Deception indicator cues

| | | |
|---|---|---|
| 1 | words count | |
| 2 | first person plural | we, our, us |
| 3 | inclusive words | with, and, include |
| 4 | affective words | happy, ugly, bitter |
| 5 | optimism and energy words | certainty, pride, win |
| 6 | social process words | talk, us, friend |
| 7 | diversity | Unique words in the text |
| 8 | first person singular | I, my, me |
| 9 | third person pronouns | she, their, them |
| 10 | assent words | yes, OK, mmhmm |
| 11 | insight words | think, know, consider |
| 12 | tentative words | maybe, perhaps, guess |
| 13 | exclusive words | but, except, without |
| 14 | past verbs | |
| 15 | present verbs | |
| 16 | futures verbs | |

Deception Detection Using Cue Matching

According to aspects of the disclosed subject matter detection detectors are employed that utilize cue matching. The first detector uses unweighted cue matching, and the second detector uses weighted cue matching. In cue matching, the higher the number of deception indicator cues that match a given email, the higher the probability of that email is deceptive. For example, if the cues computed for an email match 10 of the 16 deceptive indicator cues (i.e., as listed in Table 1), then this email is deceptive with a high probability. A selected threshold set to measure the degree of cue matching determines the probability of correct deception detection and conversely a false alarm.

Unweighted Cue Matching

The cues mentioned above can be categorized into two groups: (1) cues with an increasing trend as identified in block 112 as par of an increasing trend analysis path 110 in FIG. 6 and (2) cues with a decreasing trend, as identified in block 132 as part of a decreasing tens analysis path 130 in FIG. 6. If a cue is in the first category, analyzed in path 110, its value (which may be quantified as a normalized frequency of occurrence) will be higher for a deceptive email compared to that of a truthful email. For cues in the second category, analyzed in path 130, their values are smaller for a deceptive email.

In on embodiment, cues may be weighted as illustrated in blocks 114 and 134 of FIG. 6, and as further discussed below. Unweighted cue matching gives the same importance to all the cues and works as follows. For the increasing trend cues of an electronic text communication text, such as the text of an email, can be designated with an ith deception indicator cue value, $a_i$. If as $a_i$ is higher than the average value $\bar{a}_{idc}$ computed from a deceptive email training data set, as indicated in block 116 of FIG. 6, then this deception indicator cue $a_i$ is considered a match for this email. Then the deceptive coefficient for this cue, $c_i$ is set equal to 1, as shown in block 118. If the cue value $a_i$ is smaller than the average value $\bar{a}_{itr}$ computed from the truthful email training set, as indicated in block 120, then this email is said not to match this cue and $c_i$ is set to 0, as illustrated in block 122. If the ith cue value for the email is between $\bar{a}_{itr}$ and $\bar{a}_{idc}$, as shown in block 124, a computation, shown in block 126 and discussed below, determines how close this value is to $\bar{a}_{idc}$ and assigns its deceptive coefficient a number between 0 to 1. A similar procedure applies for the cues with a decreasing trend as well, as shown in path 130 of FIG. 6. A higher value of $c_i$ indicates that the ith cue is a strong indicator of deception. After comparing all the cues, all the deceptive coefficients are added, as illustrated in block 150 of FIG. 6 to obtain a deceptive value d. This value is then compared with a threshold t. If d>t, then the email is declared to be deceptive, otherwise it is a truthful email. The steps involved in this deception detection algorithm is shown below (e.g., with n=16):

if $\bar{a}_{idc} > \bar{a}_{itr}$ if $a_i \geq \bar{a}_{idc}$, $c_i = 1$, $i = 1, 2\ldots n$ if $a_i \leq \bar{a}_{itr}$, $c_i = 0$, $i = 1, 2\ldots n$ if $\bar{a}_{itr} < a_i < \bar{a}_{idc}$ $c_i = \dfrac{a_i - \bar{a}_{itr}}{\bar{a}_{idc} - \bar{a}_{itr}}$ $i = 1, 2\ldots n$ (as illustrated in the block diagram of FIG. 6 and discussed above)

if $\bar{a}_{idc} < \bar{a}_{itr}$ if $a_i \leq \bar{a}_{idc}$, $c_i = 1$, $i = 1, 2\ldots n$ (blocks 136 and 138 of FIG. 6)

if $a_i \geq \bar{a}_{itr}$, $c_i = 0$, $i = 1, 2\ldots n$ (blocks 140, 142 of FIG. 6)

if $\bar{a}_{idc} < a_i < \bar{a}_{itr}$ $c_i = \dfrac{\bar{a}_{itr} - a_i}{\bar{a}_{itr} - \bar{a}_{idc}}$ $i = 1,$ $2\ldots n$ (blocks 144, 146 of FIG. 6)

$$d = \sum_{i=1}^{n} c_i \text{ (block 150 of FIG. 6)}$$

d>t implies deceptive email
d<t implies truthful email

Weighted Cue Matching

In the heuristic cue matching method, as discussed above, all the cues play an equal role in detection of deception. It may be better for cues which have a higher differentiating power between deceptive and truthful emails to have a higher weight. In order to compute the weights for the cues, simulated annealing can be utilized. A cost function that maximizes the difference between the detection rate and false alarm rate can be used in this process.

The 45° line in the receiver operating characteristic curve (ROC) where the difference between the detection and false alarm probabilities is zero corresponds to purely random guesses.

Figure 7:
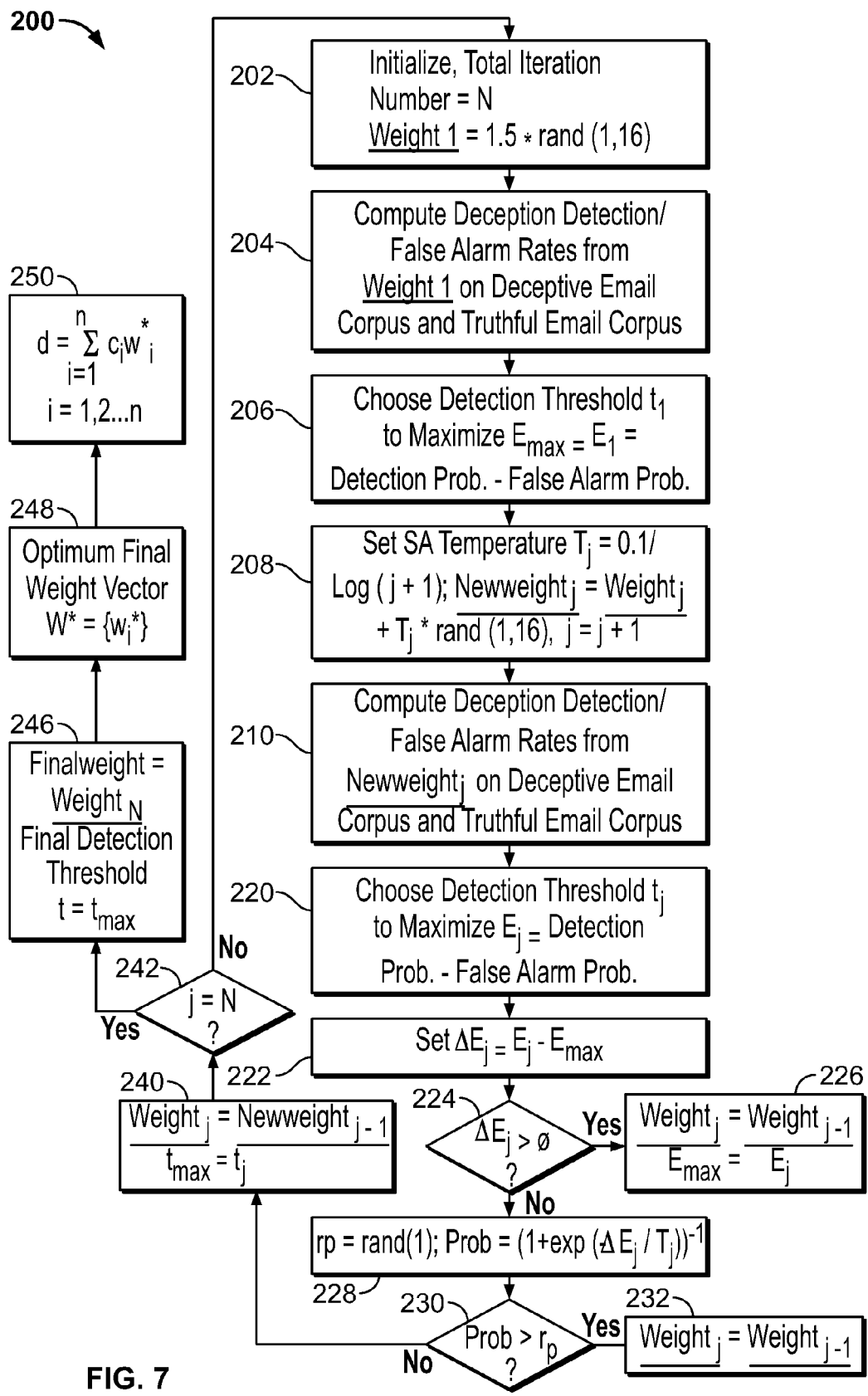
FIG. 7 illustrates schematically and in block diagram form process steps according to aspects of an embodiment of the disclosed subject matter.

Simulated annealing (SA) is a stochastic simulation method, as discussed in Sharman, "Maximum likelihood parameter estimation by simulated annealing," in Acoustics, Speech, and Signal Processing, ICASSP-88 (April 1988) ("Sharman"), which is incorporated by reference herein. The following simulated annealing algorithm steps 200, illustrated by way of example in FIG. 7, can be used to compute the weights for the cues.

Step 1: Initialization: total iteration number N, weight₁=1.5*rand(1, 16) (vector of 16 random weights), is shown in block 202 of FIG. 7;

Step 2: Compute deception detection and false alarm rates using weight₁ on deceptive and truthful training emails, is shown in block 204. Choosing a detection threshold t₁ that maximizes the cost function Emax=E1=detection probability-false alarm probability, is illustrated as the step of block 206.

Step 3: Set SA temperature Tj=0.1/log(j+1); newweight$_j$= weight$_j$+T$_j$*rand(1; 16), j=j+1, is a step shown in block 208;

Step 4: Compute the detection and false alarm rates using newweight$_j$ on deceptive and truthful training emails is the step of block 210. Chose a detection threshold t$_j$ that maximizes the cost function E$_j$=detection probability-false alarm is a step that is illustrated in block 220 of FIG. 7.

Step 5: Set ΔE$_j$=E$_j$−E$_{max}$, is illustrated in block 222. If ΔE$_j$>0, as determined in block 224, weight$_j$=newweight$_{j-1}$, and E$_{max}$=E$_j$ are set in block 226; else prob=(1+exp(−ΔE$_j$/T$_j$))$^{-1}$ and random probability r$_p$=rand(1), as illustrated in block 228. If prob>r$_p$, as determined in block 230, weight$_j$=weight$_{j-1}$; as shown in block 232, else weight$_j$= newweight$_{j-1}$; t$_{max}$=t$_j$ are set in block 240.

Step 6: repeat step 3 to step 5 until j=N, as determined in block 242, and illustrated by the feedback to block 202 if j is not equal to N, as determined in block 242, after which, finalweight=weight$_N$ and final detection threshold t=t$_{max}$ are set in block 246. The optimum final weight vector obtained by SA is W*={w$_i$*}, as illustrated in block 248. The deceptive value d is then computed using $$d = \sum_{i=1}^{n} c_i w_i^*, i = 1, \dots n,$$

as shown in block 250.

Deception Detection Using Markov Chain Model

Figure 8:
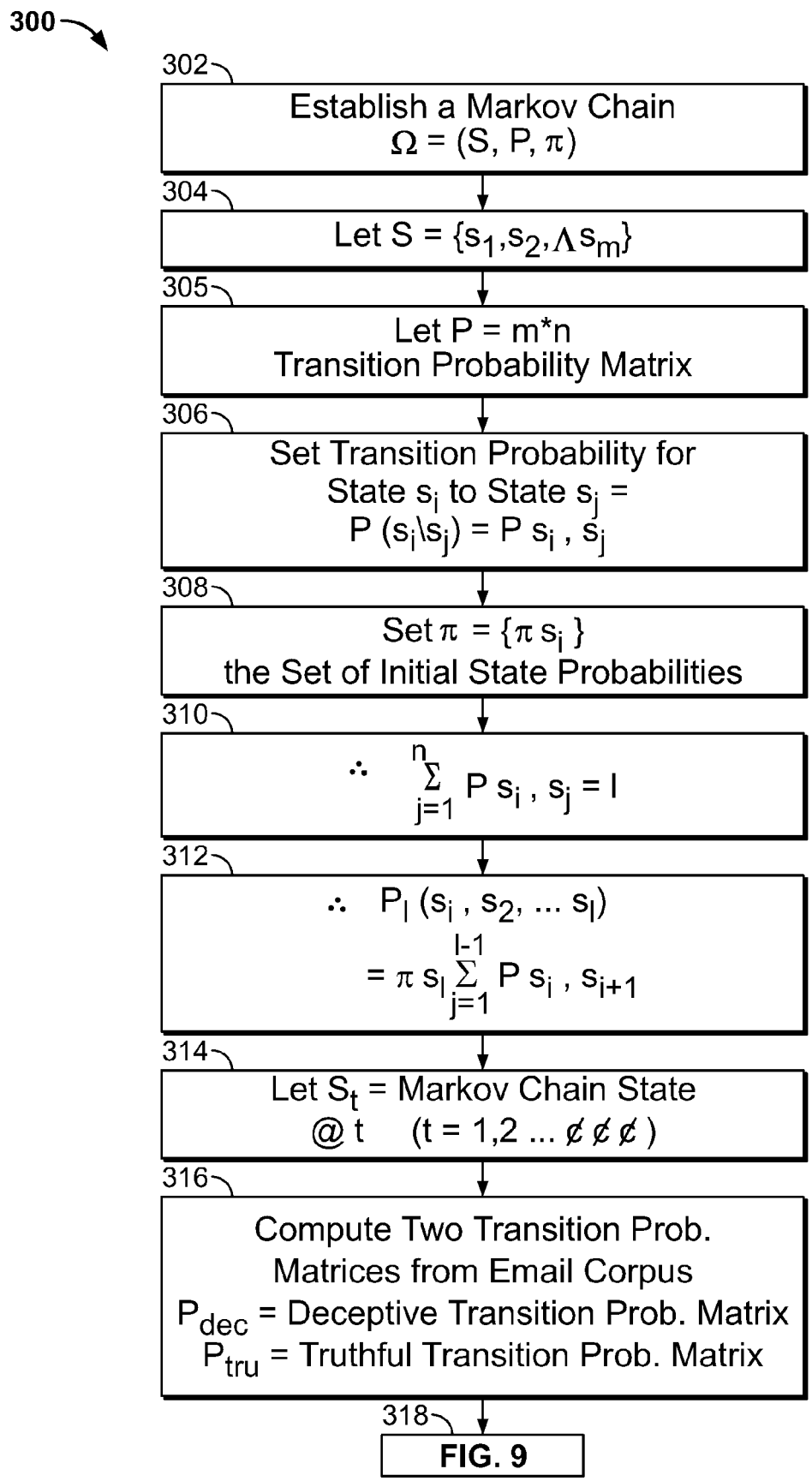
FIG. 8 illustrates schematically and in block diagram form process steps according to aspects of an embodiment of the disclosed subject matter.
Figure 9:
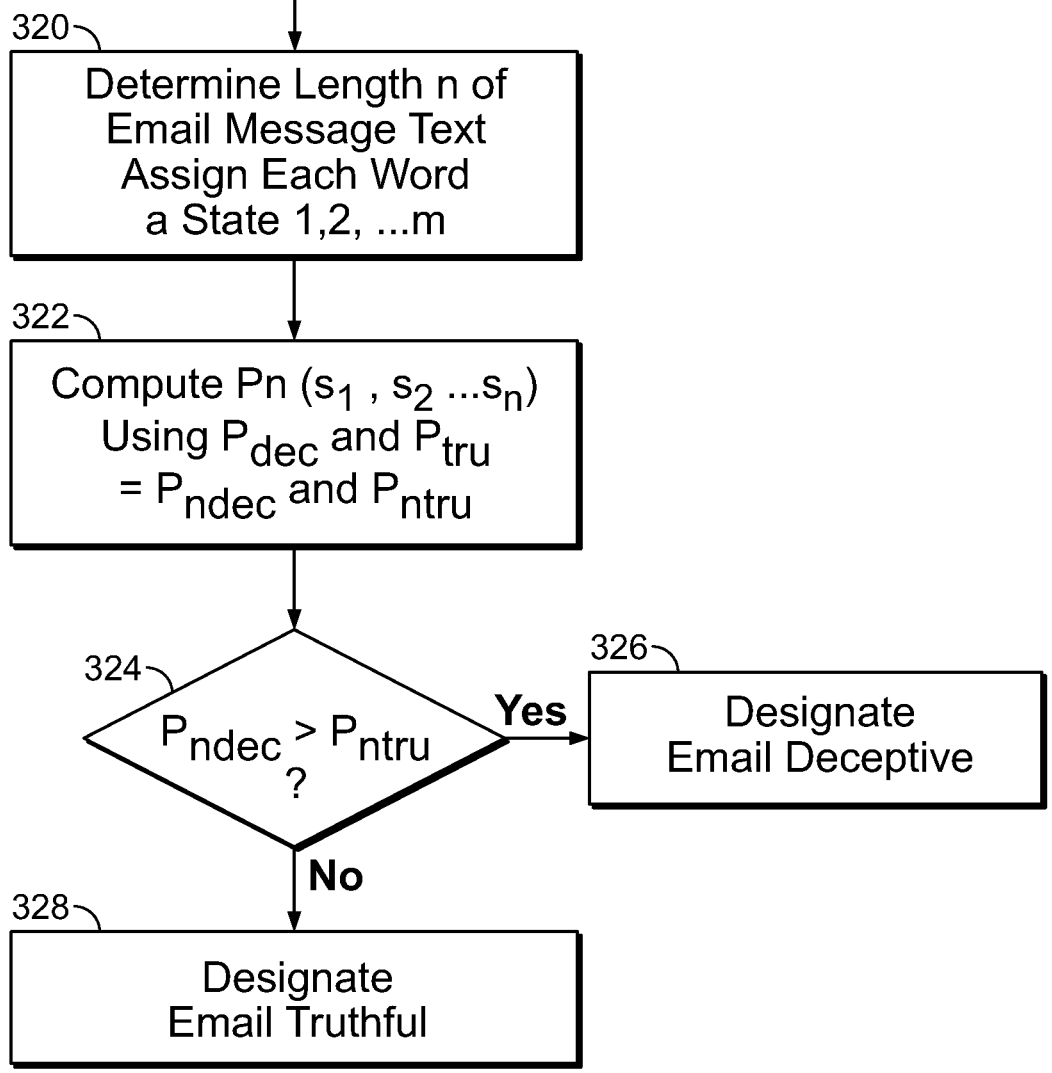
FIG. 9 illustrates schematically and in block diagram form a continuation of the process of FIG. 8.

According to aspects of an embodiment of the disclosed subject matter there can be employed a detection detector process 300, as illustrated in FIG. 8, continuing to FIG. 9, that utilizes a Markov chain model. Consider a Markov chain Ω=(S, P, π), as shown in block 302 of FIG. 8. Here S={s$_1$, s$_2$, ... s$_m$} (shown in block 302) is the set of states and P is the m*m transition probability matrix (as shown in block 305 where p(s$_j$|s$_i$)=p$_{s_i,s_j}$ denotes the transition probability from state s$_i$ to state s$_j$, as shown in block 306 of FIG. 8. Here also π={π$_{s_i}$} is the set of initial state probabilities, as illustrated in block 308. Note that $$\sum_{j=1}^{n} p_{s_i,s_j} = 1,$$

as shown in block 310. Using the Markov property, it will be observed that $$p_l(s_1, s_2, \dots s_l) = \pi_{s_1} \sum_{j=1}^{t-1} p_{s_i,s_{i+1}} \quad \text{(block 312 of FIG. 7)}. \quad (1)$$

Different combinations of words have different meanings. For example, "how are you?" and "how about you?" mean quite different things although the difference is only one word. A question to be considered is whether a sequence of words is helpful in deception detection? Note that the sequence of words also has dependency due to the grammatical structure and other linguistic and semantic reasons. Considering even the first order sequence of words (i.e., considering statistics of adjacent words in a sequence) results in a large sample space. In order to alleviate the explosion of the state space, a sequence of cues can instead be considered. For reasons mentioned above, the sequence of cues has dependence. This is modeled using a Markov chain.

In Table 1, the cues "word count" and "diversity" represent the email structure and therefore no single word can be assigned to these two cues. Therefore, it has been determined use to the remaining 14 cues along with a new cue called "other." This modified set of cues, along with state numbers corresponding to a Markov chain model, are shown in Table 2. Cues in a given electronic text communication text, such as an email text, are computed and mapped to one of these 15 states. If a computed cue does not belong to any of the first 14 cues in Table 2, it is assigned to the 15th cue called "other".

TABLE 2

Modified cues and corresponding Markov chain states

| 1 | first person singular | 2 | first person plural |
|---|---|---|---|
| 3 | third pronouns | 4 | assent language |
| 5 | affective language | 6 | optimism and energy words |
| 7 | tentative words | 8 | insight words |
| 9 | social process words | 10 | past verbs |
| 11 | present verbs | 12 | future verbs |
| 13 | inclusive words | 14 | exclusive words |
| 15 | other | | |

Therefore, in the Markov chain model, there are 15 states each corresponding to a given cue, i.e., first person singular, first person plural, third person pronouns, assent language, affective language, optimism and energy words, tentative words, insight words, social process words, past tense verbs, present tense verbs, future tense verbs, inclusive words, exclusive words and other words.

After assigning every word in a given electronic text communication text, such as an email text, to a given state, a sequence of states from 1 to 15 can be determined. An example of this is shown in FIG. 1. As illustrated in FIG. 1 the example email is "For every person that you forward this email to, Microsoft will pay you $245." There are 13 "words," 20, 21, 22, ... 33, including the number "$245." For each word 20, 21, 22, ... 33, there is assigned a cue from the list of cues in Table 2, e.g., word 21, "Other" is cue category 15, Other, and word 22, "person" is cue category 9, Social, and so forth as indicated in FIG. 1. Some words, like prepositions, "Preps" and the word "you" and also numbers, do not have a cue category, and are, therefore, not labeled with a cue category number from Table 2.

The longer the email, the longer the state sequence. As illustrated in block 314 of FIG. 7, S$_t$ denotes a state of the Markov chain at time (corresponding to word position, e.g., 20, 21, 22 ... 33 as in the illustrative example of FIG. 1) t, t=1, 2, ... M, where M is the total cue count. Two assumptions are established about the cue Markov chain similar to what is disclosed in Yin, et al., "A new intrusion detection method based on behavioral model," Proceedings of the 5th World Congress on Intelligent Control and Automation, Hangzhou (June 2004) ("Yin"), which is incorporated by reference herein):

1. the probability distribution of the cue at time t+1 depends only on the cue at time t, but does not depend on the previous cues.

2. the probability of a cue transition from time t to t+1 does not depend on the time t.

Figure 2:
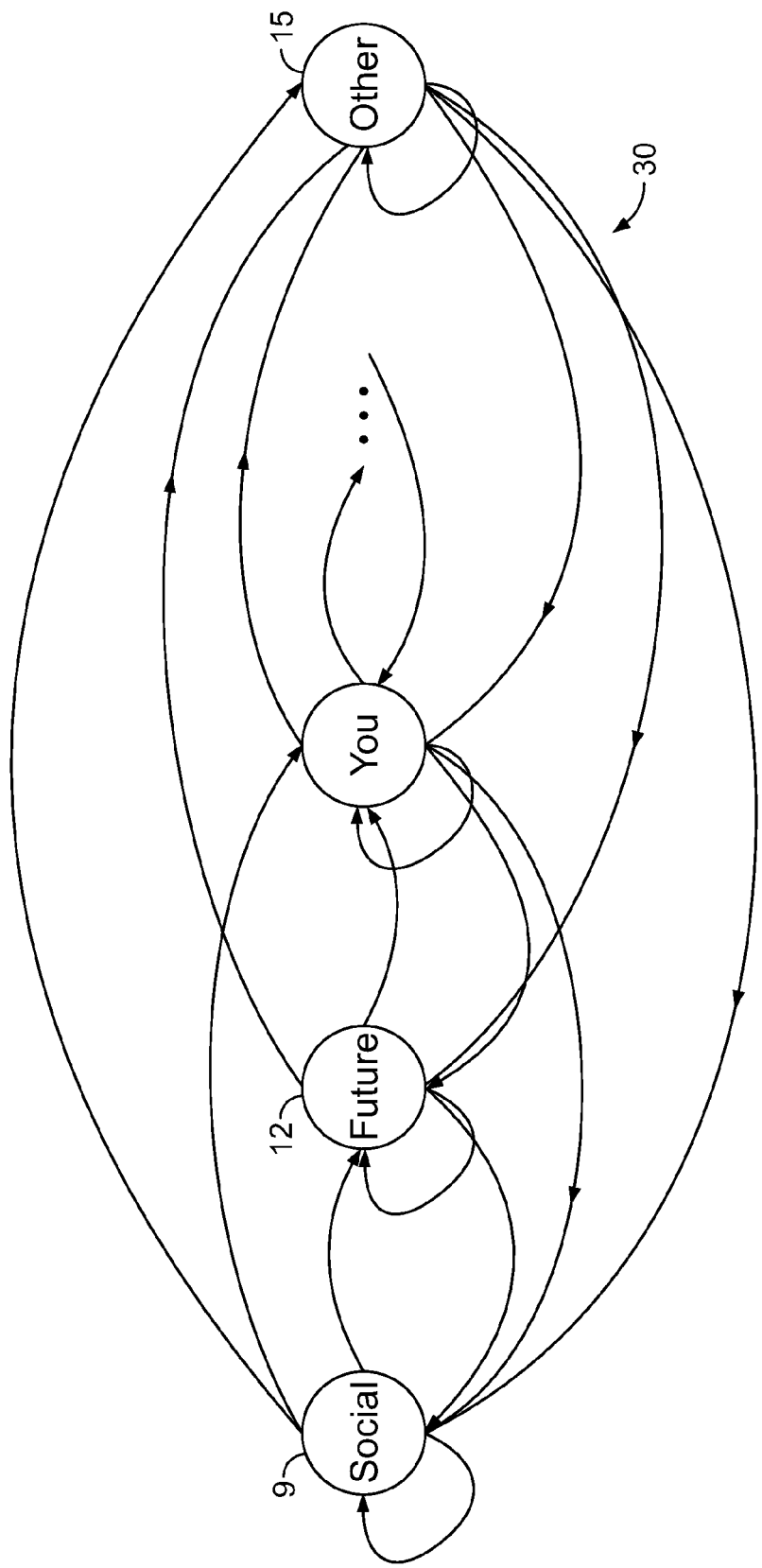
FIG. 2 is an example of a Markov chain model.

FIG. 2 shows the Markov chain model 30 for the example set of cues in Table 2. Two transition probability matrices can be computed from training data, as shown in block 316 of FIG. 7. One is the deceptive transition probability matrix $P_{dec}$, the other is the truthful transition probability matrix $P_{tru}$. The transition probability matrix is the average of the transition probability matrices computed using all the email in the training data set. For each email, each word is mapped to one psycho-linguistic cue. Then the word sequence in a given email is converted to the corresponding cue sequence. A transition probability between two cues is computed for each email. To compute the transition probability between two cues, say, A and B we compute the conditional probability P(A|B). To compute this number one can compute the number of times the cue A follows cue B and divide by the total number of times cue B occurs, whereby by examining all possible transitions A|B, B|C, A|C, A|D, B|D, C|D, etc, a transition probability matrix is constructed for each email. The average of the transition probability matrices of the emails in a training data set can then be used as the training transition probability matrix.

The deception detection algorithm 300 further works as follows, as illustrated in the block diagram of process steps shown in FIG. 9:

Step 1: Let n denote the length of the email. Assign each word in the email a state between 1 to m, where m is the number of cue states, e.g., 15. Thus, each state is denoted as a number between 1 to m. Each word in an email is mapped into one state. Thus each word will be mapped into a number between 1 to m.

Step 2: Using equation (1) referenced above, compute the probability of n states using the transition probability matrices $P_{dec}$ and $P_{tru}$ and denote these as $P_{ndec}$ and $P_{ntru}$, as shown in block 322.

Step 3: Maximum likelihood detector: if $P_{ndec} > P_{ntru}$, as determined in block 324, then the email is deceptive, as shown in block 326, and otherwise it is truthful, as indicated in block 328 of FIG. 9.

Deception Detection Using SPRT

Figure 10:
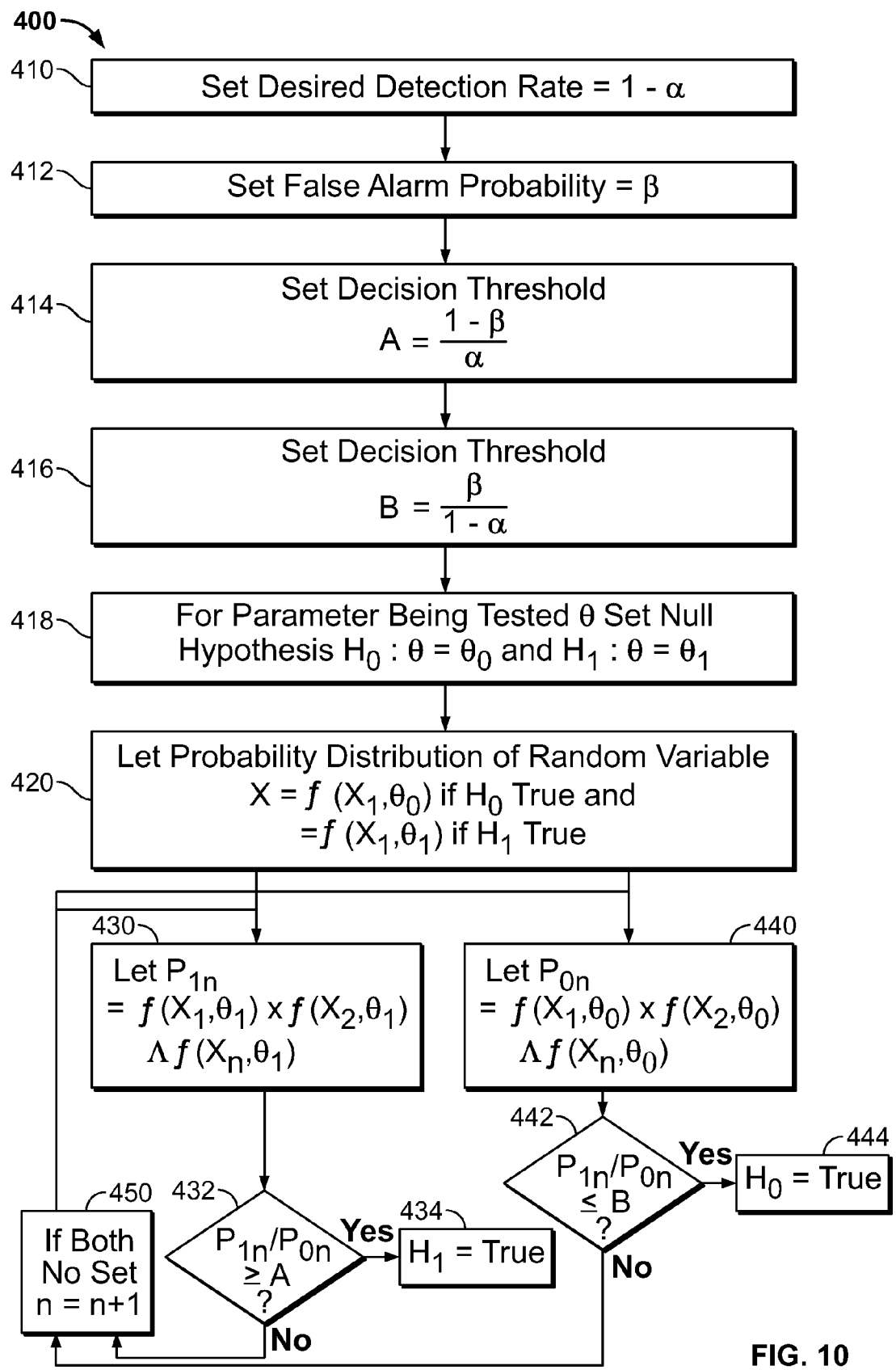
FIG. 10 illustrates schematically and in block diagram form process steps according to aspects of an embodiment of the disclosed subject matter.

According to aspects of an embodiment of the disclosed subject matter, a sequential probability ratio test (SPRT) may be employed as a deception detector (i.e., considering deception detection as a binary hypothesis test, as shown by way of example in block diagram form in FIG. 10). SPRT, first proposed by Wald in Wald, Sequential Analysis, London: Chapman and Hall, LTD (1947) ("Wald"), which is incorporated by reference herein, is known to be optimal (under certain conditions) in terms of requiring the minimum average number of samples required for a binary hypothesis test.

Null and alternate hypotheses, respectively, $H_0: \theta = \theta_0$ and $H_1: \theta = \theta_1$ can be considered, where $\theta$ is the parameter being tested, as illustrated in block 418 of the process 400 illustrated by way of example in FIG. 10. The probability distribution of a random variable X is $f(x, \theta_0)$ when $H_0$ is true and $f(x, \theta_1)$ when $H_1$ is true, as illustrated in block 420. Successive observations of X can be denominated $x_1, x_2, \ldots$. For two given decision thresholds A and B SPRT can be used to detect $H_1$ as true (block 434) if $p_{1n}/p_{0n} \geq A$ (block 432); $H_0$ as true (block 444) if $p_{1n}/p_{0n} \leq B$ (block 442) as illustrated in FIG. 10; and considers one more sample (n=n+1) if neither of these two conditions $H_0$, $H_1$ is true, as shown in block 450. Here, $p_{1n} = f(x_1, \theta_1) \times f(x_2, \theta_1) \times \ldots \times f(x_n, \theta_1)$ (block 430) and $p_{0n} = f(x_1, \theta_0) \times f(x_2, \theta_0) \times \ldots \times f(x_n, \theta_0)$ (block 440).

The optimum decision thresholds A and B depend on the desired detection rate $1-\alpha$ and the false alarm probability, $\beta$ and are given by $$A = \frac{1-\beta}{\alpha} \text{ (block 414 in FIG. 10)} \quad (2)$$

$$B = \frac{\beta}{1-\alpha} \text{ (block 416)} \quad (3)$$

An electronic text communication text, such as an email text can be designated as deceptive $H_0$, and can be designated as truthful $H_1$. Using 16 deceptive cues from Table 1 above (which can each be designated by a random vector X), cue vectors can be computed for the given electronic text communication text, such as an email text and used as an observed random variable for purposes of an SPRT. The variables may be modeled as independent, Gaussian, random variables. The probability density function ("PDF") of these variables can be computed using a kernel density estimator using the training data set. The kernel density estimation is a statistical non-parametric method of estimating the probability density function of a random variable. Using kernel density estimation on the training data, the probability density function of the variables can be obtained. Then the likelihood ratio at the nth stage can be expressed as:

$$l_n = \frac{p_{1n}}{p_{0n}} = \frac{f(x_1, x_2, \ldots, x_n : H_1)}{f(x_1, x_2, \ldots, x_n : H_0)} \quad (4)$$

$$= \frac{\prod_{i=1}^{n} \frac{1}{\sqrt{2\pi}\sigma_{1i}} \exp\left\{-\frac{1}{2}\left(\frac{x_i - \mu_{1i}}{\sigma_{1i}}\right)^2\right\}}{\prod_{i=1}^{n} \frac{1}{\sqrt{2\pi}\sigma_{0i}} \exp\left\{-\frac{1}{2}\left(\frac{x_i - \mu_{0i}}{\sigma_{0i}}\right)^2\right\}}$$

Therefore, $$\log(l_n) = \sum_{i=1}^{n} \log\left(\frac{\sigma_{0i}}{\sigma_{1i}}\right) + \frac{1}{2}\sum_{i=1}^{n}\left[\left(\frac{x_i - \mu_{0i}}{\sigma_{0i}}\right)^2 - \left(\frac{x_i - \mu_{1i}}{\sigma_{1i}}\right)^2\right] \quad (5)$$

Where $\mu_{0i}, \sigma_{0i}$ are the mean and variance of ith variables in a deceptive case, $\mu_{1i}, \sigma_{1i}$ are the mean and variance of ith variables in a truthful case. According to SPRT, for a detection rate, the detector is given by $\log(l_n) \geq \log(A)$ indicating accept $H_1$ as true and the email is normal, and if $\log(l_n) \leq \log(B)$ accept $H_0$ as true and the email is deceptive, else n=n+1 and repeat the steps.

If the test does not terminate after n=16 then use maximum likelihood detector at that stage.

Performances of the Four Deception Detectors

The performances of the four deception detectors can be viewed using the phishing and ham (truthful) email data sets described previously with respect to the article Phishing. Results are also provided for an archived 300 email scams data set (as examples of deceptive text content) available at http://www.scamaorama.com.

Performance evaluation metrics can be:

1. Overall accuracy is the percentage of electronic text communication texts, such as email texts that are classified correctly;

2. Detection rate is the percentage of deceptive emails that are classified correctly;

3. False positive is the percentage of truthful emails that are classified as deceptive.

Figure 3:
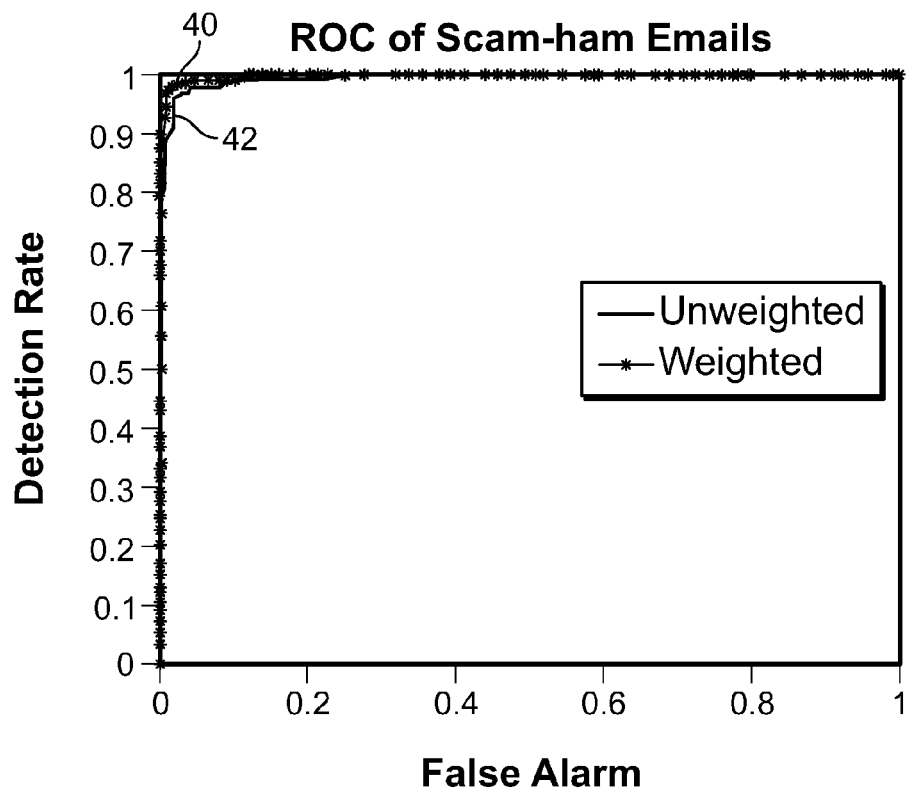
FIG. 3 is a receiver operating characteristic curve of a cue matching detector for a scam and ham email data set.
Figure 4:
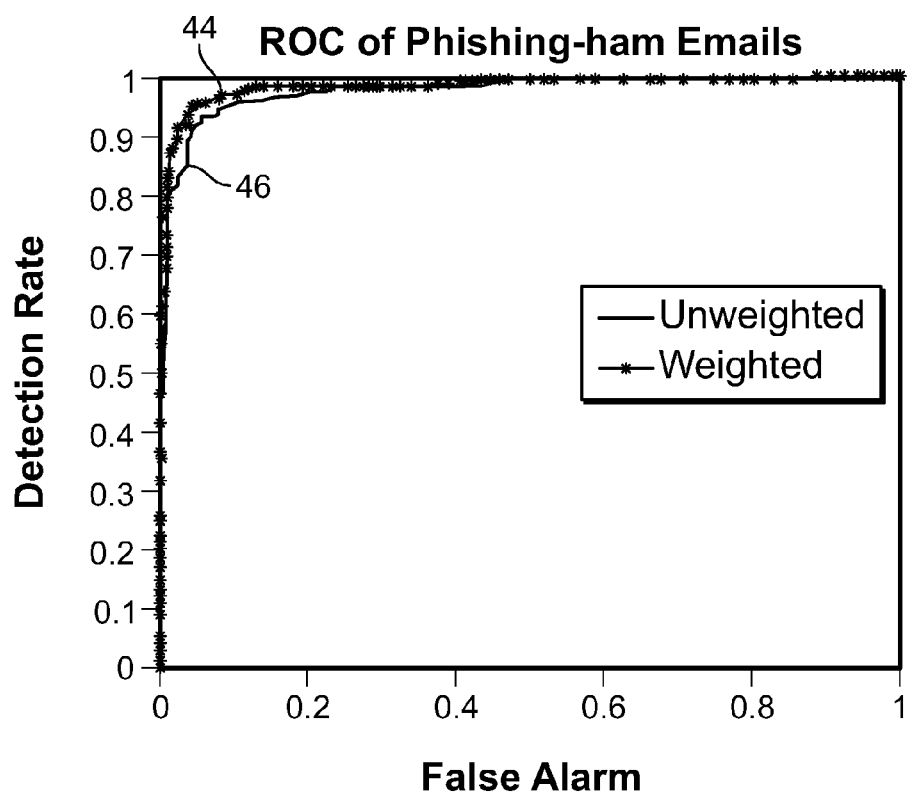
FIG. 4 is a receiver operating characteristic curve for a phishing and ham email data set.

All the detection results can be measured using a 10-fold cross validation in order to test the generality of the proposed methods. FIGS. 3 and 4, respectively, show a receiver operating characteristic curve ("ROC") for the scam and phishing email data sets mixed with the ham data set. The 45° line in the ROC represents a difference between the detection and false alarm probabilities being zero, corresponding to purely random guesses.

It can be seen that weighted cue matching, indicated by curves 40, 44 performs slightly better than un-weighted cue matching, indicated by curves 42, 46. The deception detectors are compared with a decision tree algorithm. Table 3 shows that the weighted cue matching produces the highest overall accuracy among all the methods for scam-ham email data set. Table 4 show results indicating the best over all performance for the phishing-ham email data set is the use of the Markov chain model. For the four methods, as indicated in Table 3 only the SPRT detector has a slightly worse detection rate than a decision tree algorithm. All the four proposed detectors are better than the decision tree classifier for the phishing-ham email data set, e.g., as shown in Table 3.

The high accuracy and low false alarm results indicate that the 16 cues are good indicators of deception in the text of electronic text communications such as the text of emails.

TABLE 3

Detection results on scam-ham email data

| Methods | Detection rate | False alarm | Overall accuracy |
|---|---|---|---|
| Unweighted cue matching | 96.57% | 1.94% | 97.61% |
| Weighted cue matching | 97.40% | 1.86% | 97.90% |
| Markov chain model | 98.46% | 4.69% | 96.20% |
| SPRT | 96.91% | 2.76% | 97.15% |
| Decision tree | 91.67% | 2.26% | 96.05% |

TABLE 4

Detection results on phishing-ham email data

| Methods | Detection rate | False alarm | Overall accuracy |
|---|---|---|---|
| Unweighted cue matching | 93.08% | 6.13% | 93.51% |
| Weighted cue matching | 94.:97% | 5.09% | 94.:96% |
| Markov chain model | 96.91% | 5.07% | 95.91% |
| SPRT | 89.71% | 4.84% | 92.50% |
| Decision tree | 92.26% | 8.71% | 91.77% |

Compression Based Language Model for Deception Detection

Lossless compression techniques can be used to compute a probabilistic model for the data before encoding. Typically, a probabilistic model of the random source (or language) generating the data is not known a priori. Techniques such as prediction by partial matching (PPMC), as discussed in Cleary, et al., "Data compression using adaptive coding and partial string matching," IEEE Transactions on Communications, Vol. 32, pp. 396-402 (April 1984) ("Cleary"), which is incorporated by reference herein, can aid in computing a model given the data. If the model is accurate then the compression rate will be close to the entropy of the source which is the lower bound for the achievable compression rate. If the model mismatch is high then the achieved compression rate will be poor. Therefore, the cross entropy between the model the data set can be used as a measure of discrepancy.

Figure 5:
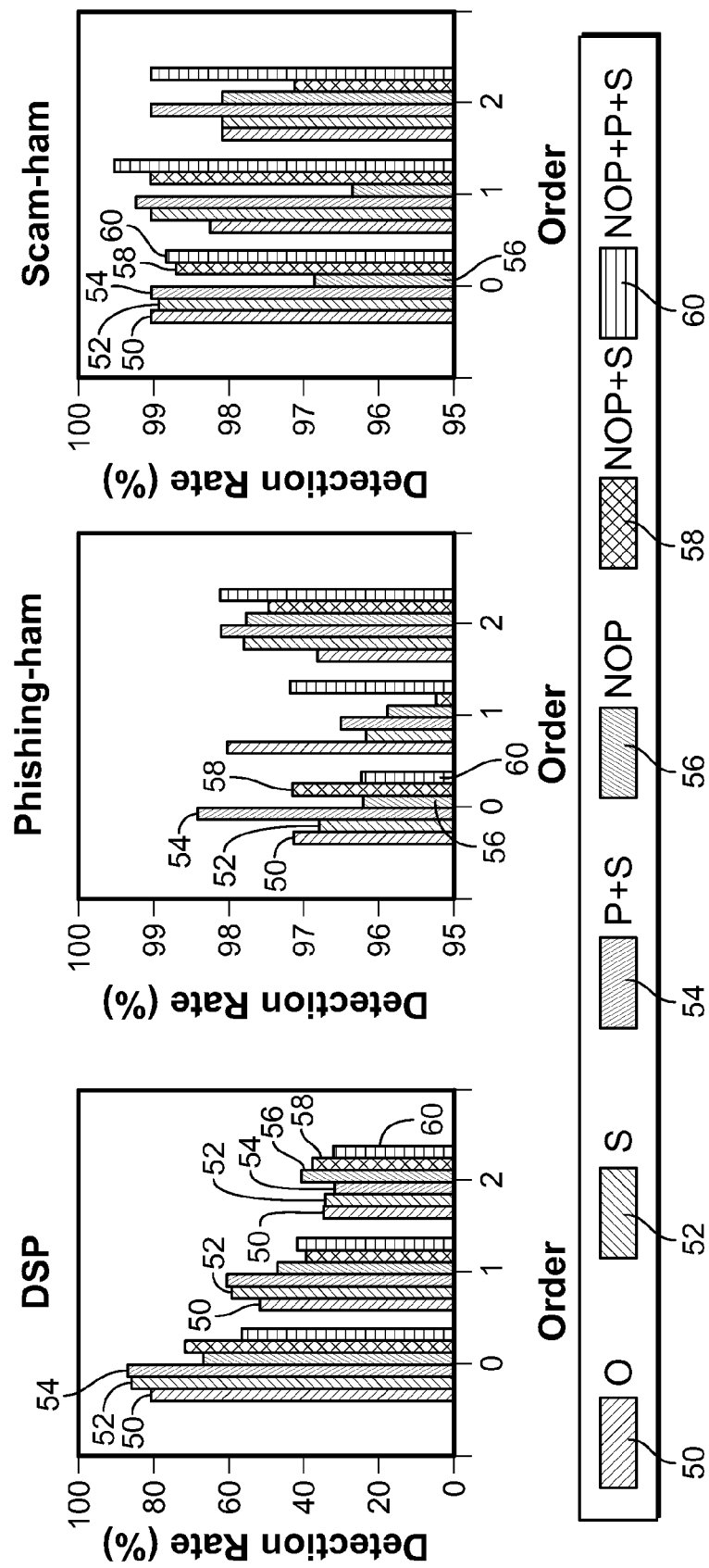
FIG. 5 is a series of graphs that depict performance of word based deception detection, where: O=original, S=stemming, P=pruning, and NOP=no punctuation.
Figure 5:
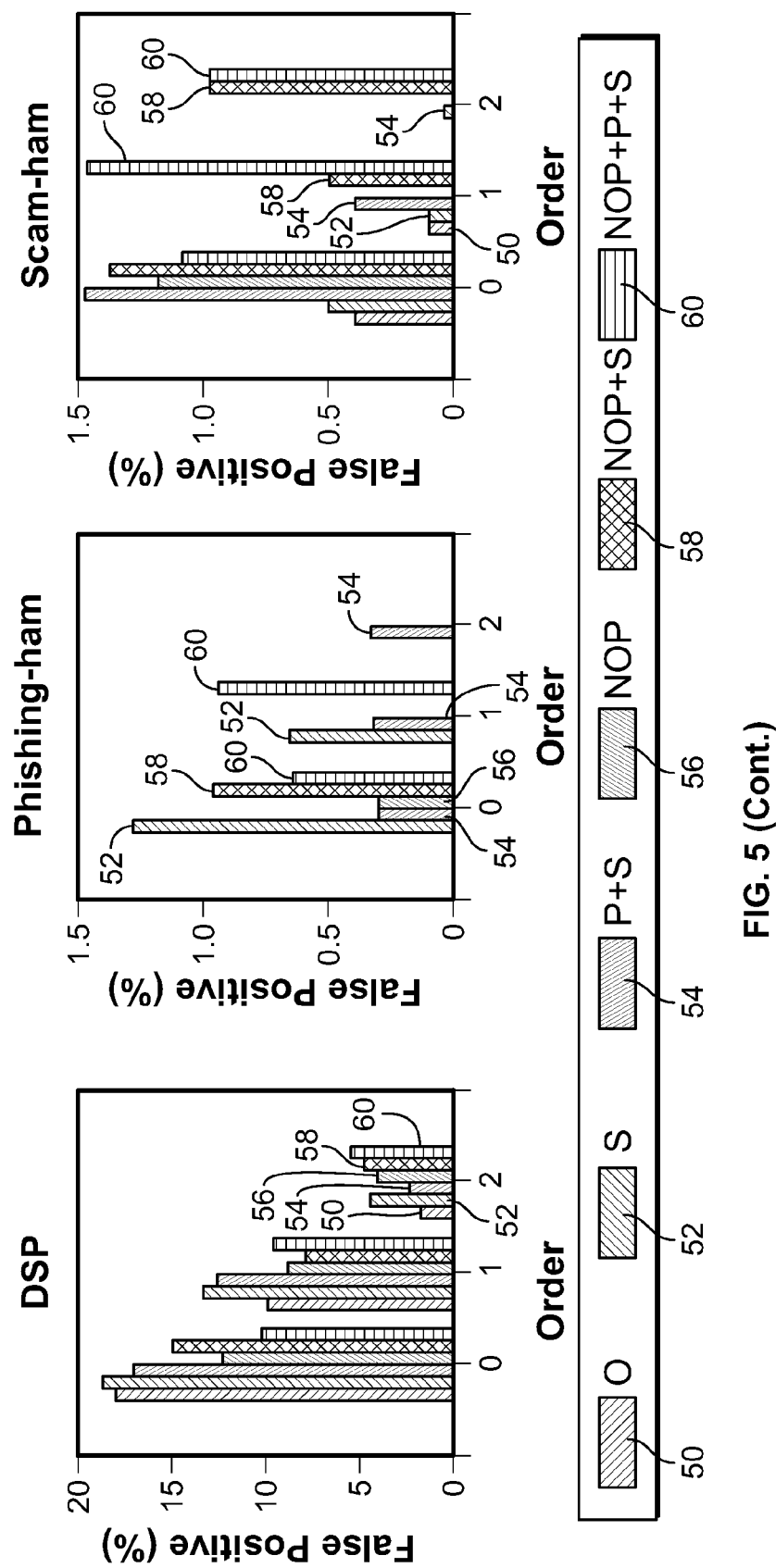

Probabilistic models using prediction by partial matching, as discussed in Cleary can be computed for two ground truth data sets, namely, deceptive and non-deceptive. Then the target text content can be classified as being deceptive or non-deceptive as the output of an optimization problem. The optimization problem can maximize (over two classes: deceptive and non-deceptive) the cross entropy of the two probabilistic models for the ground truth data sets and the target text document. The target text document can be declared to belong to the class that maximizes the cross entropy. FIG. 5 shows experimental results for word based PPMC based deception detection for three data sets: desert survival problem (DSP), phishing-ham and scam-ham. FIG. 5 illustrates Detection percentages and False Positive percentages. FIG. 5 shows the results for six cases, namely, using the original target text document as is 50, stemming 52, pruning plus stemming 54, removing punctuations in the document ("NOP") 56, NOP plus stemming 58 and NOP plus stemming and pruning 60. It can be seen from these figures that up to 99.4% overall accuracy is achievable.

It should be appreciated that the disclosed subject matter provides numerous advantages over the prior art discussed above. Psycho-linguistic cues are good indicators of deception in text, if the cues are carefully chosen. The 16 cues identified in the present application are strong indicators of deception. In an embodiment, it is possible to achieve 97.9% accuracy with 1.86% false alarm while detecting deception. Weighting the cues results in a small improvement in the overall accuracy compared to treating all the cues with equal importance. All four deception detector models perform better than decision trees for the phishing-ham email data set. Compression based deception detection has the capability to build probabilistic models for deceptive and non deceptive data in real-time and cues are not required explicitly—up to 99.4% overall accuracy is achieved for email scam-ham data set.

As used in this application the term "a computing device," such as may form a part of a system or be utilized to perform method steps as part of a method according to aspects of an embodiment of the disclosed subject matter for detecting deception in electronic text communication texts, such as email texts, by way of example, may comprise a computer processor or other processor unit capable of obtaining and executing instructions, such as application and operating system software instructions. The processor may be any form of hardware device for executing software instructions which may be stored in and obtained from a storage medium, such as cache memory, main memory, local disc storage and remote disc storage and may reside in different ones of such types of memory at different times.

The processor may be any custom made or commercially available processor, a central processing unit (CPU), an auxiliary processor among several processors associated with the processing unit, a semiconductor based microprocessor (in the form of a microchip or chip set), a macroprocessor, a microcontroller, and array of processors, a networked array of computing devices or generally any device for executing software instructions. The processor may comprise a controller, microcontroller, or a hard wired, including firmware, device, or any combination thereof, or any other processor capable of performing logic driven operations, under partly or fully programmable instructions.

Software operating on the processor may include one or more separate programs, each of which comprises an ordered listing of executable instructions for implementing logical functions. Software may be in the form of application software and operating system software which is stored in a tangible medium, such as any of the storage media (memories) noted above. The operating system essentially controls the execution of other computer programs by the computing device. Software may be written and compiled as (a) an object oriented programming language, which has classes of data and methods, or (b) a procedure programming language, which has routines, subroutines, and/or functions, such as C, C++, Pascal, Basic, Fortran, Cobol, Perl, Java, and Ada or standard Internet languages, such as XML or HTML.

In the context of this disclosure, a tangible computer readable medium may be any electronic, magnetic, optical, or other physical device or means that can contain or store a computer program for use by or in connection with a computing device related system or method. The tangible computer readable medium can be, for example, but not limited to, an electronic, magnetic, optical, electromagnetic, infrared, or semiconductor system, apparatus, device, or non-transitory propagation medium, including, by way of example an electrical connection (electronic) having one or more wires, a portable computer diskette (magnetic), a random access memory (RAM) (electronic), a read-only memory (ROM) (electronic), an erasable programmable read-only memory (EPROM), an electronically erasable programmable read only memory ("EEPROM"), a Flash memory (electronic), an optical fiber memory (optical), and a portable compact disc read-only memory (CDROM) (optical), a tape (magnetic), a large disc storage medium, etc.

The present invention is described below with reference to block diagrams and/or operational illustrations of methods and devices to perform methods according to aspects of an embodiment of the disclosed subject matter (collectively "block diagram"). It is understood that each block of the block diagram can be implemented by means of analog or digital hardware and computer program instructions, such as on a computing device.

In some alternate implementations, the functions/acts noted in the blocks or steps can occur out of the order noted in the block diagrams or operational illustrations. For example, two blocks shown in succession can in fact be executed substantially concurrently or the blocks can sometimes be executed in the reverse order, depending upon the functionality/acts involved.

It should be noted that the presently claimed subject matter can have numerous modifications and variations. For instance, additional psycho-linguistic cues indicative of deception can be determined using the experimental methods employed in the development of presently claimed subject matter.

It will be understood that the embodiments described herein are merely exemplary and that a person skilled in the art may make many variations and modifications without departing from the spirit and scope of the claimed subject matter. For instance, all such variations and modifications are intended to be included within the scope of the appended claims.

We claim:

1. A method for automatically determining whether a text in digital form is deceptive, comprising:
   receiving a body of text data in digital form in a computer, the body of text data known to contain text containing true content and text containing deceptive content, the true text and deceptive text having been previously classified as such;
   automatically and programmatically analyzing the body of text data in digital form in the computer to identify psycho-linguistic cues that are indicative of text being deceptive;
   subsequently receiving a sample of text in digital form that is to be evaluated for truth or deception in a computer, the computer having access to the psycho-linguistic cues identified in the step of automatically and programmatically analyzing;
   automatically and programmatically statistically analyzing the sample of text via the computer and without human intervention, to ascertain whether the sample of text is deceptive based upon the presence of the psycho-linguistic cues in the sample text,
   wherein the psycho-linguistic cues are selected from a list consisting of the number of: (1) words, (2) first person plural words, (3) inclusive words, (4) affective language words, (5) optimism and energy words, (6) social process words and less of the number of (7) diversity words, (8) first person singular pronouns, (9) third person pronouns, (10) assent language words, (11) insight words, (12) tentative words and (13) exclusive words, (14) past tense verbs, (15) present tense verbs and (16) future tense verbs.

2. The method of claim 1 further comprising:
   weighting the psycho-linguistic cues and statistically analyzing based on the weighted psycho-linguistic cues.

3. The method of claim 1, wherein the statistically analyzing step is performed using one of a cue matching analysis, a weighted cue matching analysis, a Markov chain analysis, and a sequential probability ratio testing binary hypothesis analysis.

4. The method of claim 1 wherein the psycho-linguistic cues are separated into categories, including increasing trend cues and decreasing trend cues and are analyzed according to presence in a category from within the categories.

5. A method for automatically and programmatically determining whether a text in digital form is deceptive by analysis in a computing device, comprising:
   establishing a set of cues in digital form in a computing device;
   automatically and programmatically determining by a computing device without human intervention if a cue in the set of cues is part of one of a sub-set of increasing trend cues and a sub-set of decreasing trend cues;
   for increasing trend cues,
      for each ith deception indicator cue value $a_i$, determining, via a computing device, whether $a_i$ for a text is higher than an average value $\bar{a}_{idc}$ determined from evaluation of a deceptive text training data set;
      when $a_i > \bar{a}_{idc}$ labeling this deception indicator cue $a_i$ as a match for the text and setting a deceptive coefficient for the ith cue, $c_i$, equal to 1;
      determining, via a computing device, whether $a_i$ is lower than the average value $\bar{a}_{itr}$ determined from evaluation of a truthful text training set;
      when $a_i < \bar{a}_{itr}$ labeling this deception indicator cue $a_i$ as not a match for the text and setting the deception coefficient for the ith cue, $c_i$, equal to 0;
      determining, via a computing device, whether $a_i$ is between $\bar{a}_{itr}$ and $\bar{a}_{idc}$;
      computing, via a computing device, how close $a_i$ is to $\bar{a}_{idc}$ and setting the deceptive coefficient $c_i$ to a value between 0 to 1 accordingly;
   for decreasing trend cues
      for each ith deception indicator cue value, $a_i$ determining, via a computing device, whether $a_i$ for a text is lower than an average value $\bar{a}_{idc}$;

labeling this deception indicator cue $a_i$ as a match for the text and setting the deceptive coefficient for the ith cue, $c_i$, equal to 1;

determining, via a computing device, whether $a_i$ is higher than the average value $\bar{a}_{itr}$;

when $a_i > \bar{a}_{itr}$ labeling this deception indicator cue $a_i$ as not a match for the text and setting the deception coefficient for the ith cue, $c_i$, equal to 0;

determining, via a computing device, whether $a_i$ for the text is between $\bar{a}_{itr}$ and $\bar{a}_{idc}$;

computing, via a computing device, how close $a_i$ is to $\bar{a}_{itr}$ and setting the deceptive coefficient $c_i$ a value between 0 to 1 accordingly;

summing the deceptive coefficients $c_i$ to obtain a deceptive value d; and, labeling the text as deceptive at least in part based upon the value d.

6. The method of claim 5 further comprising:

digitally labeling the text as deceptive at least in part based on d being greater than a selected threshold value t.

7. The method of claim 5 wherein:

the sub-set of increasing trend cues includes cues where $\bar{a}_{idc} > \bar{a}_{itr}$ for the respective cue and the subset of decreasing trend cues included cues wherea $\bar{a}_{idc} < \bar{a}_{itr}$ for the respective cue.

8. The method of claim 5, further comprising:

weighting each $c_i$.

9. The method of claim 8 wherein the weighting is according to a simulated annealing algorithm.

10. A process for determining whether a text in digital form is deceptive, comprising:

automatically and programmatically establishing a set of cues in a computing device; and evaluating, via a computing device, whether the text is deceptive based on an automated, programmatic Markov chain evaluation of cue sequences in the digital text, wherein the Markov chain evaluation comprises utilizing an evaluation of the probability of a transition from a first cue state to a second cue state for a plurality of cues defining a series of cues possibly occurring within a text containing m cues.

11. The method of claim 10, further comprising:

selecting a desired detection rate $\alpha$;

selecting a false alarm probability $\beta$;

setting a decision threshold $A = (1-\beta)/\alpha$;

setting a decision threshold $B = \beta/(1-\alpha)$;

for a parameter being tested $\theta$, set a null hypothesis $H_0: \theta = \theta_0$ and $H_1: \theta = \theta_1$;

let a probability distribution of a random variable $X = f(X, \theta_0)$ if $H_0$ is true and $X = f(X, \theta_1)$ if $H_1$ is true;

determining, via a computing device, $p_{1n} = f(X_1, \theta_1), f(X_2, \theta_1), \ldots f(X_n, \theta_1)$;

determining, via a computing device, $p_{0n} = f(X_1, \theta_0), f(X_2, \theta_0), \ldots f(X_n, \theta_0)$;

designating $H_1$ as true if $p_{1n}/p_{0n} \geq A$; and designating $H_0$ as true if $p_{1n}/p_{0n} \leq B$.

12. The method of claim 11 further comprising:

incrementing n to n+1 and repeating the steps of claim 11 if neither of $p_{1n}/p_{0n} \geq A$ and $p_{1n}/p_{0n} \leq B$ is true.

13. A process for determining whether a text in digital form is deceptive, comprising:

automatically and programmatically establishing a set of cues in a computing device; and evaluating, via a computing device, whether the text is deceptive based on an automated, programmatic Markov chain evaluation of cue sequences in the digital text;

determining the number of words n in the text;

assigning a state to each word 1 ... n in the text according to whether the word is within a particular cue category;

computing, via the computing device, the probabilities of n consecutive transitions, $P_{ndec}$ and $P_{ntru}$, according to the equation:

$$p_l(s_1, s_2, \ldots s_l) = \pi_{s_1} \sum_{j=1}^{l-1} p_{s_i, s_{i+1}}$$

for all $p_1$ within the text, utilizing a first transition probability matrix $P_{dec}$, comprising an average of transition probablility matrices determined from an evaluation of deceptive texts from a database of deceptive texts, and a second transition probability matrix $P_{tru}$, comprising an average of transition probability matrices determined from an evaluation of true texts from a database of true texts.

14. The method of claim 13, further comprising:

labeling the text as deceptive where $P_{ndec} > P_{ntru}$.

* * * * *